(12) United States Patent
Böhm et al.

(10) Patent No.: US 7,499,575 B2
(45) Date of Patent: Mar. 3, 2009

(54) COMPUTER-ASSISTED DETECTION METHOD FOR DIAPHRAGM EDGES CAUSED IN AN IMAGE BY A DIAPHRAGM

(75) Inventors: Stefan Böhm, Oberasbach (DE); Klaus Finkler, Spardorf (DE)

(73) Assignee: Siemens Aktiengesellschaft, Munich (DE)

( * ) Notice: Subject to any disclaimer, the term of this patent is extended or adjusted under 35 U.S.C. 154(b) by 917 days.

(21) Appl. No.: 10/808,958

(22) Filed: Mar. 25, 2004

(65) Prior Publication Data

US 2004/0234133 A1    Nov. 25, 2004

(30) Foreign Application Priority Data

Mar. 25, 2003   (DE) .................... 103 13 510

(51) Int. Cl.
*G06K 9/00*    (2006.01)
(52) U.S. Cl. .................... 382/128
(58) Field of Classification Search ........... 382/128, 382/132, 173, 190
See application file for complete search history.

(56) References Cited

U.S. PATENT DOCUMENTS

| | | | |
|---|---|---|---|
| 5,351,306 A | | 9/1994 | Finkler et al. |
| 5,734,739 A | * | 3/1998 | Sheehan et al. ............. 382/128 |
| 5,790,690 A | * | 8/1998 | Doi et al. .................... 382/128 |
| 5,901,240 A | | 5/1999 | Luo et al. |
| 5,960,102 A | * | 9/1999 | Van Eeuwijk et al. ....... 382/128 |
| 6,415,049 B1 | * | 7/2002 | Yanagita et al. ............. 382/132 |
| 6,445,771 B1 | * | 9/2002 | Buzug et al. ................ 378/150 |

FOREIGN PATENT DOCUMENTS

| | | |
|---|---|---|
| DE | 197 34 725 | 2/1999 |
| DE | 197 42 152 | 3/1999 |
| EP | 0 635 804 | 7/1994 |

\* cited by examiner

*Primary Examiner*—Tom Y Lu
(74) *Attorney, Agent, or Firm*—Schiff Hardin LLP

(57) ABSTRACT

In a computer-assisted method for detecting diaphragm edges caused in an image by a diaphragm, the image and information about an inner structure of the diaphragm are provided to a computer. The computer first detects all image edges that are present in the image. Using the information about the inner structure of the diaphragm, it then determines the diaphragm edges from among the detected image edges.

14 Claims, 4 Drawing Sheets

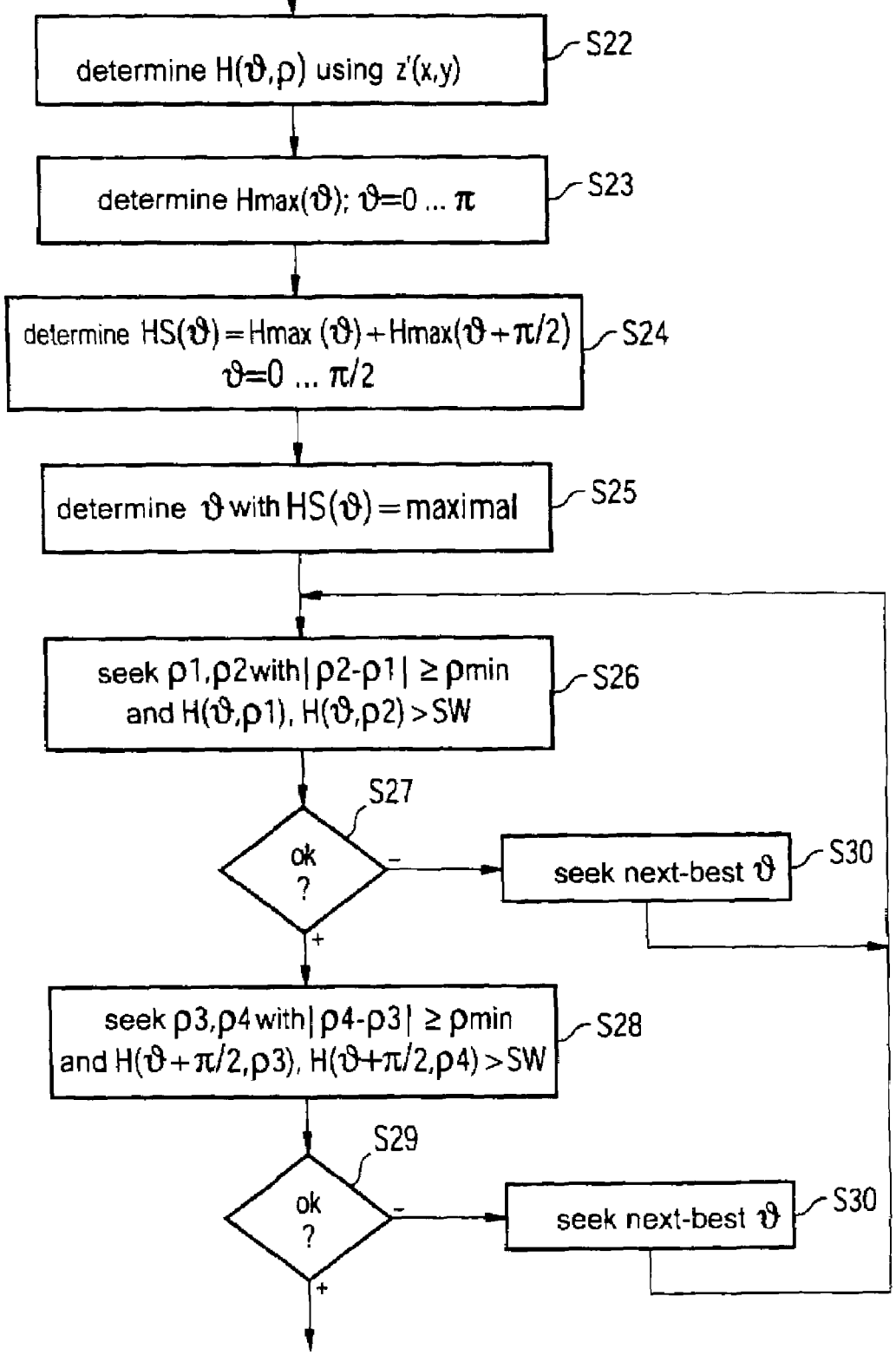

COMPUTER-ASSISTED DETECTION METHOD FOR DIAPHRAGM EDGES CAUSED IN AN IMAGE BY A DIAPHRAGM

BACKGROUND OF THE INVENTION

1. Field of the Invention

The present invention concerns a computer-assisted detection method for diaphragm edges caused in an image by a diaphragm, of the type wherein the image is provided to a computer, the computer detects image edges present in the image, and the diaphragm edges are determined from the detected image edges.

2. Description of the Prior Art

In particular in the acquisition of x-ray images, the radiation beam path is normally blocked at the outer edge with shielding elements—for example, lead plates or the like. The radiation exposure for the examined subject (usually a person) is thereby minimized, and irradiation and/or scattered radiation effects are at least partially reduced. Furthermore, the data quantity is reduced. This concerns both the storage of the image data and its reproduction and processing.

The shielding elements form a diaphragm. The inner edges of the shielding elements are the diaphragm edges. They normally form a polygon, usually a rectangle, but the rectangle does not always exhibit the same orientation.

Relevant image information is located only within the inner (unblanked) region defined by the diaphragm edges.

Naturally, it is possible to acquire and display the entire image and then have a user enter an input representing the position of the diaphragm edges. For example, the user can plot these edge positions interactively in the displayed image, but this procedure is slow, laborious and error-prone.

Therefore, methods have been developed for computer-assisted detection of diaphragm edges by means of which the detection mentioned above is automatically possible. German OS 197 42 152, German OS 197 34 725 and U.S. Pat. No. 5,351,306 disclose examples of such methods.

The known methods operate quite satisfactorily in the majority of application cases. Given disadvantageous conditions, in particular when large implants are located in the patient to be examined or when the diaphragm contrast differs too little from the patient contrast, the diaphragm edges, however, are not recognized as such. It is thus possible that no diaphragm edge recognition ensues at all or that edges in the image of the examination subject are incorrectly determined as the diaphragm edges.

SUMMARY OF THE INVENTION

An object of the present invention is to provide a computer-assisted detection method with which the diaphragm edges can be detected with higher certainty, even under disadvantageous conditions.

The object is achieved in a method of the type initially described wherein, in addition to the image, information about the inner structure of the diaphragm is provided to the computer, and the computer determines the diaphragm edges from among all detected image edges using the information about the inner structure of the diaphragm.

When, for example, it is thus known that the diaphragm edges form a rectangle (or a regular hexagon), the computer can test whether, in addition to one image edge, a further image edge running in parallel and two (or four) further image edges exist that, with the first image edge, form an angle of 90° (or of +60° and −60°). Only then can the first image edge be a diaphragm edge.

The detection of the diaphragm edges ensues in two main steps, namely with the detection of all image edges, as well with the determination of the diaphragm edges from among the image edges.

The image normally has a number of two-dimensionally disposed pixels, with a grey scale value that lies between minimal and maximal possible values is associated with each pixel. In this case, image edge determination proceeds by the computer detecting the image edges by determining derivative value for each pixel and detecting the images edges using the derivative values.

The computer can determine the derivative values as a sum of at least four summands, with each of the summands being comprised of a product of a derivative in a derivative direction and a weighting factor, and the computer determines the weighting factor specific to the derivative.

It is particularly advantageous in this case for the derivative directions to form direction pairs, with the derivative directions of each direction pair being aligned oppositely. The derivative directions of different direction pairs should form with one another an angle varying from 0° to 180°, in particular an angle of approximately 90°. When the image has main axes orthogonal to one another, the derivative directions can be parallel to the main axes.

Outside of the region defined by the diaphragm edges, the image ideally should have no variations whatsoever (realistically only slight variations). Significant jumps (=image edges) thus should occur either only within the gated region or at the crossover to the gated region, thus at the diaphragm edge itself. The computer therefore preferably reduces the derivative-specific weighting factor when it determines a derivative different from zero for an intermediate pixel arranged between the pixel under consideration and an initial pixel. The initial pixel thereby lies on an edge of the image. A vector from the initial pixel to the pixel under consideration corresponds with the respective direction of derivative. With this procedure, image edges thus are weighted, in general, inversely to the size of the jumps that exist before the edge is detected to be present (larger jumps lower weighing).

Furthermore, negative jumps, thus jumps from high to low grey scale values, occur only within the gated region. Given equal magnitude of the derivative for the intermediate pixel, when the computer therefore reduces the derivative-specific weighting factor more significantly given a negative derivative for the intermediate pixel than given a positive derivative for the intermediate pixel, negative jumps lead to a particularly significant reduction of the weighting factor.

Dependent on the information about the inner structure of the diaphragm, the diaphragm edges can, for example, exhibit known angles with one another. In this case it is possible, as already mentioned, to detect the diaphragm edges by the computer detecting groups of detected image edges that, with one another, form at least one of the known angles.

When, according to the information about the inner structure of the diaphragm, two of the diaphragm edges run parallel to one another, the computer preferably assesses such image edges running parallel to one another as diaphragm edges only when the image edges running parallel to one another exhibit a minimum separation from one another. This reflects the fact that the diaphragm edges in practice always exhibit a minimum separation from one another.

The detection method works particularly reliably when the computer forms a sum value of the derivative values for the groups of image edges that, with one another, form at least one of the known angles and tests the groups image edges in the series of the sum values, with the computer testing groups of image edges with larger sum values before groups of image edges with lesser sum values.

DESCRIPTION OF THE DRAWINGS

FIGS. 3 through 6 are flowcharts showing the basic steps of the inventive method and various embodiments thereof.

DESCRIPTION OF THE PREFERRED EMBODIMENTS

Figure 1:
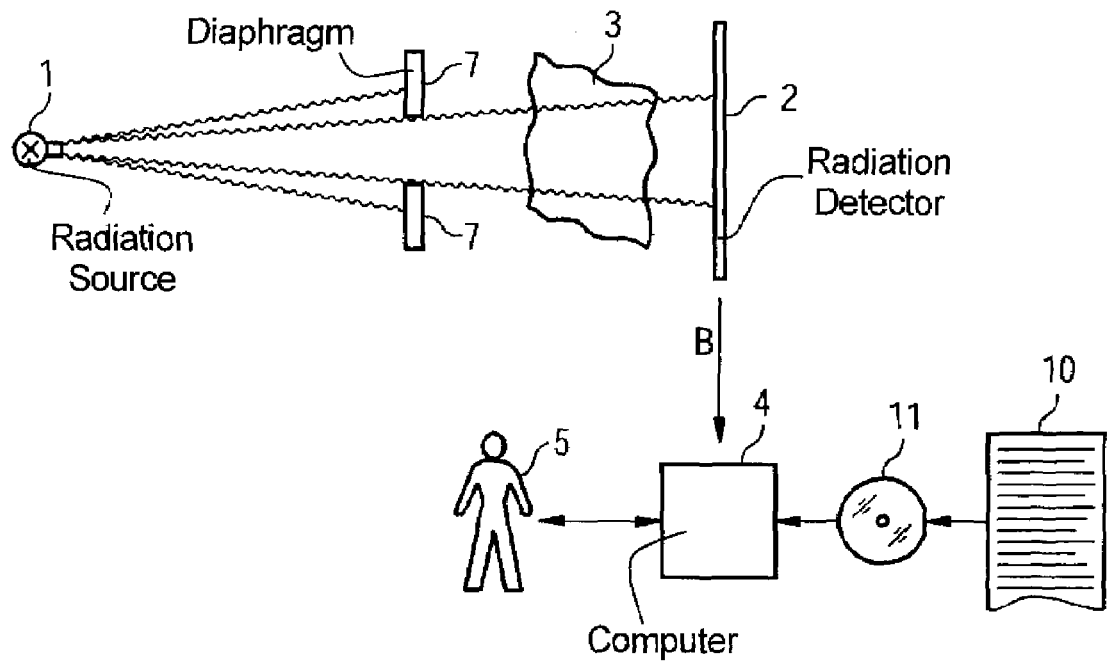
FIG. 1 is a schematic illustration of an x-ray examination apparatus operating in accordance with the inventive method, and employing a computer program with a computer programmed product according to the invention.

The x-ray arrangement shown in FIG. 1 has an x-ray source 1 and an x-ray detector 2. An image B of a subject 3—for example a person 3—is acquired by the x-ray arrangement and is supplied to a computer 4. The image B is evaluated by the computer 4, output to a user 5 and, as the case may be, also archived.

Figure 2:
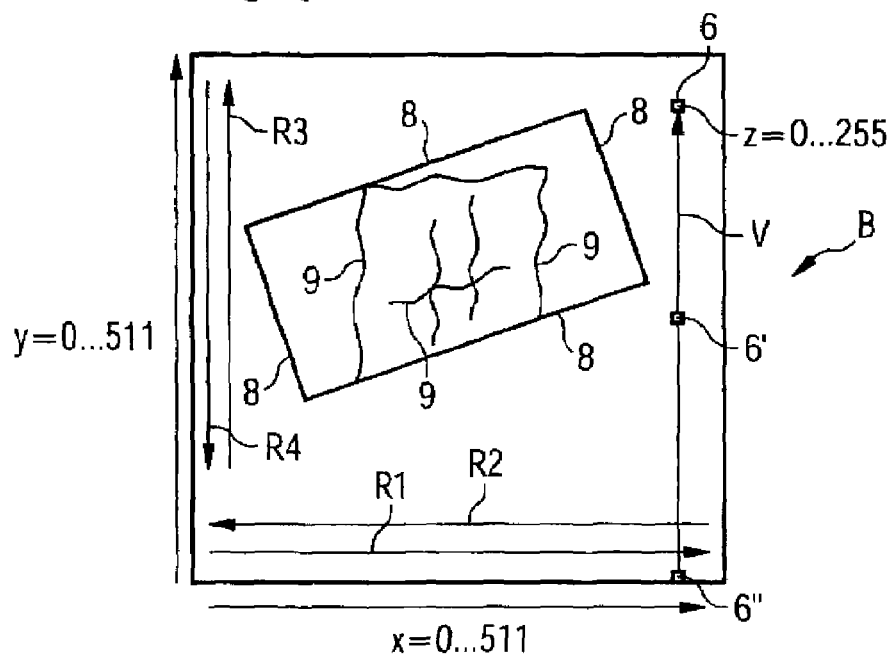
FIG. 2 schematically illustrates an x-ray image obtained with the apparatus of FIG. 1, for explaining the inventive method.

The image B is shown as an example in FIG. 2. According to FIG. 2, the image B has a number of pixels 6, 6', 6". The pixels 6, 6', 6" are two-dimensionally arranged relative to main axes x, y. The main axes x, y are orthogonal to one another. In the example of FIG. 2, the image B has 512×512 pixels 6, 6', 6". Each pixel 6, 6', 6" exhibits a grey scale value that is between zero (minimum possible value) and, for example, 255 (maximum possible value).

X-ray radiation is ionizing radiation. In order to keep the radiation exposure of the subject 3 to a minimum, according to FIG. 1 a diaphragm 7 is disposed in the beam path of the x-ray arrangement. Among other things, the diaphragm 7 causes diaphragm edges 8 in the image B, in addition to image edges 9 caused by the subject 3.

According to FIG. 2, the diaphragm edges 8 form, for example, a rectangle. Therefore, for any given diaphragm edge 8 three further diaphragm edges 8 are present in the image B, independent of the arrangement and/or rotation of the diaphragm 7. One of these further diaphragm edges 8 runs parallel to the first cited diaphragm edge 8 and both other additional diaphragm edges 8 form an angle of 90° with the first cited diaphragm edge 8. This information about the inner structure of the diaphragm 7 can be used by the computer for detecting the diaphragm edges 8.

For automatic computer-assisted detection of the diaphragm edges 8, the computer 4 is programmed with a computer program 10 that is stored on a data medium 11, for example a CD-ROM 11 in (exclusively) machine-readable format. Based on the programming with the computer program 10, the computer 4 executes the detection method (subsequently described in detail) for the diaphragm edges 8.

Figure 3:
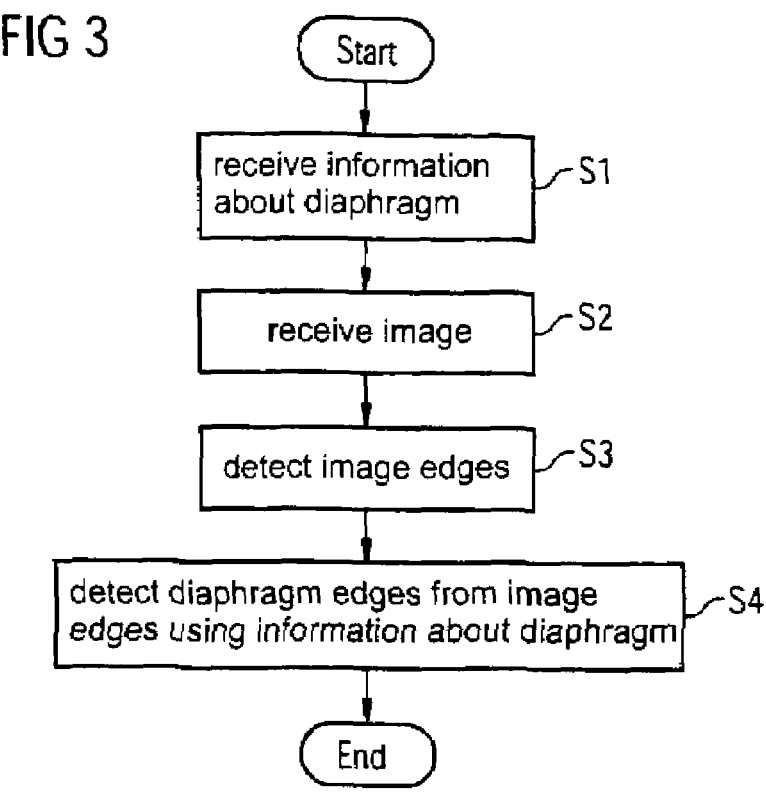

According to FIG. 3, in a step S1 the computer 4 first receives information about the inner structure of the diaphragm 7. In a step 2, it then receives the image B. In a step S3, the computer 4 then detects the image edges 8, 9 that are present in the image B. At this point in time, it is still unknown to the computer 4 which of the image edges 8, 9 are the diaphragm edges 8 it seeks. In a step S4, the computer 4 detects the desired diaphragm edges 8 from among the image edges 8, 9 using the information about the inner structure of the diaphragm 7.

The receipt of information about the inner structure of the diaphragm 7 and the receipt of the image B in the steps S1 and S2 requires no more detailed explanation. The detection of the image edges 8, 9 and of the diaphragm edges 8 in the steps S3 and S4 is explained in more detail in FIGS. 4 through 6.

Figure 4:
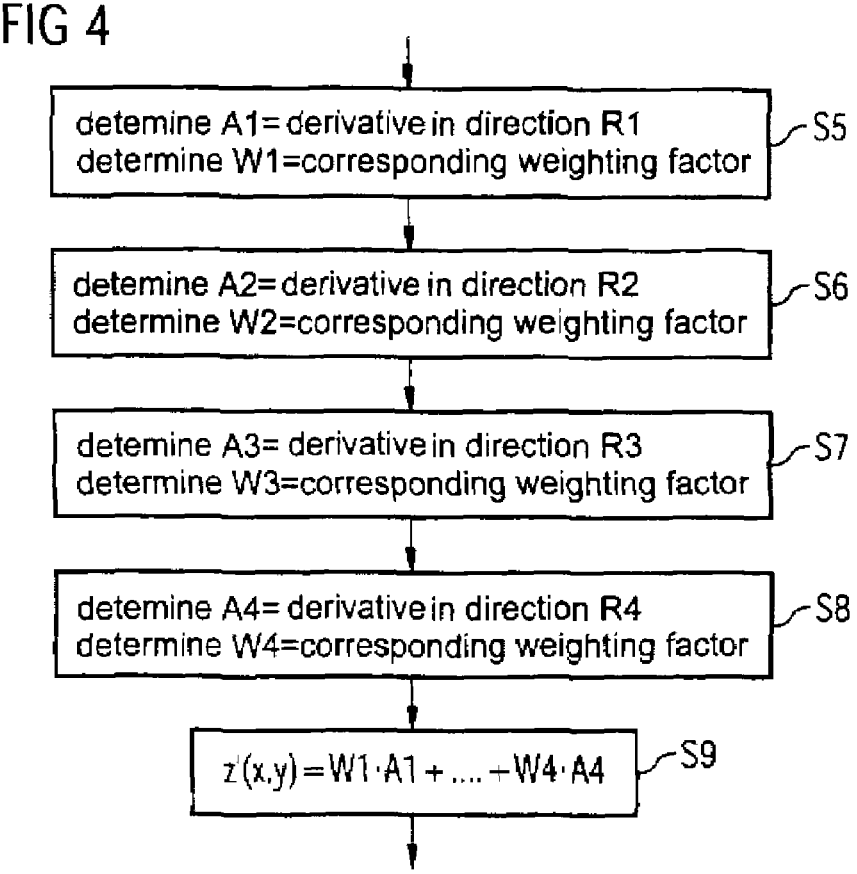

To detect the image edges 8, 9, according to FIG. 4 in a step S5 the computer 4 first determines a first derivative A1 and a corresponding weighting factor W1 for each pixel 6, 6', 6" in a first derivative direction R1. The computer 4 also does this in second, third and fourth derivative directions R2 through R4 in steps S6 through S8. In a step S9, the computer 4 then determines for each pixel 6, 6', 6" a derivative value z' as a sum of the derivatives A1 through A4, with each of the summands A1 through A4 being weighted with its corresponding weighting factor W1 through W4.

The determined derivative value z' can then be tested by the computer 4 as to whether it exceeds (in terms of magnitude) a threshold. When this is the case, the corresponding pixel 6, 6', 6" is taken to be a component of an image edge 8, 9. Using the derivative value z', the computer 4 is thus able to detect the image edges 8, 9.

As can be seen from FIG. 2, the derivative directions R1 and R2 form a direction pair of derivative directions R1, R2 directed opposite to one another. The same is true for the derivative directions R3 and R4. The derivative directions R1 through R4 thereby preferably run parallel to the main axes x, y. In particular, the direction pairs form with one another an angle that is significantly different from 0° and 180°, in the present example equal to 90°.

There are various possibilities to detect the derivatives A1 through A4 and the corresponding derivative-specific weighting factors W1 through W4. A procedure is subsequently specified in connection with FIG. 5 that has proven to be particularly reliable in tests. Only the step S7 from FIG. 4 is explained in detail in FIG. 5. The procedure with regard to steps S5, S6 and S8 is wholly analogous.

Figure 5:
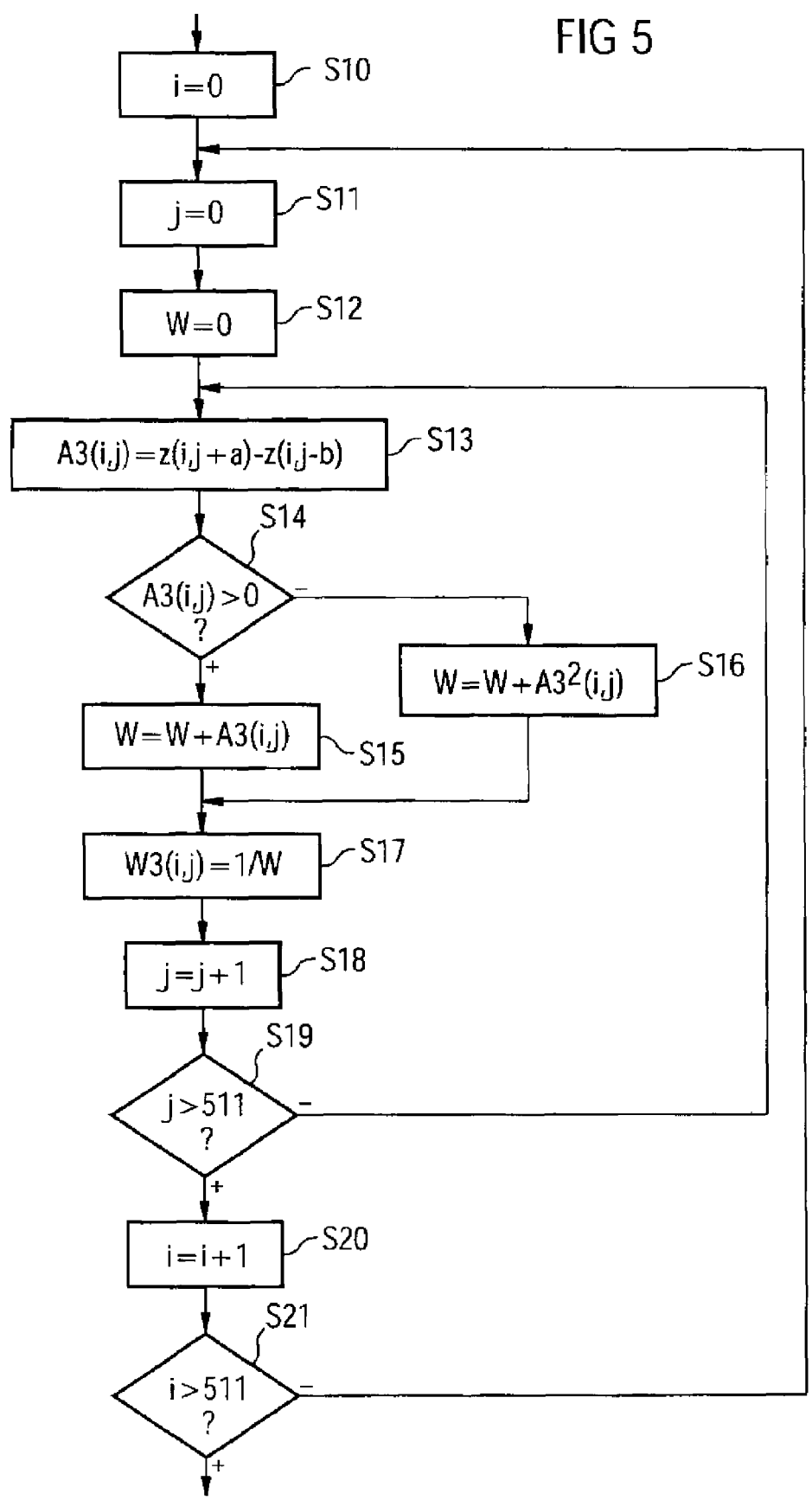

According to FIG. 5, in steps S10 through S12 curve indices i, j and a derivative sum W are initially set to zero. In a step S13, the derivative A3 is then determined at the point (i,j) according to the formula $$A3(i,j) = z(i,j+a) - z(i,j-b)$$

wherein a and b are non-negative offsets. One of the two offsets a, b may be zero, but at least one must be different from zero. The offsets a, b preferably assume the same value and/or lie between one and three.

In a step S14, it is tested whether the derivative A3 is larger or smaller than zero at the location (i,j). When the derivative A3 is larger than zero, the derivative sum W is increased by the derivative A3 in a step S15. Alternatively, the derivative sum W is increased by the square of the derivative A3 in a step S16.

In a step S17, the derivative-specific weighting factor W3 at the point (i,j) is then set equal to the reciprocal of the derivative sum W.

In steps S18 and S19, the curve index j is increased by one and tested as to whether it has already exceeded the value 511 (thus has arrived at the image edge). If this is still not the case, a return to step S13 is made. Alternatively, in steps S20 and S21 the curve index i is increased by one and likewise checked as to whether the curve index i has exceeded the value 511 (thus has arrived at the image edge). If this is still not the case, a return to step S11 is made. Alternatively, the determination of the derivative A3 and of the corresponding weighting factor W3 ends for the third derivative direction R3.

As already mentioned, other methods are possible for detecting the derivatives A1 through A4 and the derivative-specific weighting factors W1 through W4. However, the procedure according to FIG. 5 exhibits the advantage that the computer 4 reduces the derivative-specific weighting factor W3 every time it comes up against an image edge 8, 9. The reduction is greater the larger the jump is, thus the larger the derivative A3. Negative jumps are more strongly weighted than positive jumps. The following effects result:

- The computer 4 reduces the derivative-specific weighting factor W3 when it determines a derivative A3 different than zero beforehand, thus for an intermediate pixel 6' that is arranged between an initial pixel 6" and the presently considered pixel 6. The initial pixel 6" is on an edge of the image B, and a vector V from the initial pixel 6" to the pixel 6 under consideration corresponds with the respective derivative direction R3.
- The weighting factor W3 is reduced more the larger the jump (thus the magnitude of the derivative A3) for the intermediate pixel 6'.
- Given equal magnitude of the derivative A3 for the intermediate pixel 6', the weighting factor W3 is more significantly reduced given a negative derivative A3 for the intermediate pixel 6' than given a positive derivative A3 for the intermediate pixel 6'.

To detect the diaphragm edges 8 in step S4 of FIG. 3, a method is executed that is subsequently explained in detail in connection with FIG. 6.

According to FIG. 6, a Hough transformation is first implemented by the computer 4 in a step S22 using the derivative values z', and thus a transformed image is determined in Hough space. This image, called the Hough-transformed H, exhibits variables $\theta$, $\rho$. It is subsequently designated as H($\theta$, $\rho$). $\theta$ and $\rho$ are an angle variable and a distance variable, respectively. The angle variable $\theta$ specifies which angle a straight line makes with the main axis x. The distance variable $\rho$ specifies the distance $\rho$ this straight line exhibits from the intersection point of the main axes x, y. The value of H at the point ($\theta$,$\rho$) specifies how strongly this straight line is present in the derivative image z'.

The Hough transformation as such is generally known. It is therefore not gone into in more detail in the following.

In a step S23, the computer 4 determines the maximum Hmax($\theta$) of the Hough-transformed H($\theta$,$\rho$) for each value of the angle variables $\theta$. This one-dimensional function Hmax($\theta$) is subsequently designated as an angle maximum.

In a step S24, the computer 4 determines a sum maximum HS($\theta$) according to the formula $$HS(\theta)=H\max(\theta)+H\max(\theta+\pi/2).$$

To detect the diaphragm edges 8, the computer 4 thus detects respective groups of detected image edges 8, 9 that with one another form the known angle of 90° (or $\pi$/2). For the groups of image edges 8, 9 thus detected, the computer 4 forms a sum value of the derivative values z' or of the corresponding Hough-transformed H.

In a step S25, the computer 4 determines the value of the angle variables $\theta$ at which the sum maximum HS is maximal. For this value of the angle variables $\theta$, in a step S26 the computer 4 then seeks values $\rho1$, $\rho2$ of the distance variables $\rho$ in which the amount of the difference of the distance variables $\rho1$, $\rho2$ is at least as large as a minimum distance $\rho$min, and in which the value of the Hough-transformed H below the angle $\theta$ is greater than a threshold SW. It thus tests whether two parallel image edges 8, 9 that exhibit a minimum separation $\rho$min from one another exist below the angle $\theta$. In step S26, the computer 4 could, for example, determine the separation values $\rho1$, $\rho2$ such that the sum of the Hough-transformed H($\theta$,$\rho1$)+H($\theta$,$\rho2$) is maximal. Alternatively, it could, for example, also maximize the difference of the distance values $\rho1$, $\rho2$.

When, the computer 4 has found such a distance variable $\rho1$, $\rho2$ in step S26, it branches from a step S27 to a step S28. In step S28, the computer 4 determines in an analogous manner distance values $\rho3$, $\rho4$ in which the amount of the difference of the distance values $\rho3$, $\rho4$ is likewise at least as large as the minimal distance $\rho$min, and in which the value of the Hough-transformed H for the angle variable $\theta+\pi/2$ is greater than the threshold SW. In a step S29, the computer 4 again checks whether it could find such distance variables $\rho3$, $\rho4$. When this occurs, it has detected the sought diaphragm edges 8.

If the testing in one of the steps S27, S29 is negative, step S30 is executed. In step S30, the computer 4 determines the next-best value of the angle variables $\theta$, thus the value of the angle variables $\theta$ in which the sum maximum HS assumes the next lowest value. It then jumps back to step S26.

The method according to FIG. 6 is thus implemented until four image edges 8, 9 are detected which fulfill the required diaphragm structure (rectangle) and exhibit a sufficient strength. The computer 4 thereby checks the groups of image edges 8, 9 in the series of sum values HS, by testing groups with larger sum values before groups with lower sum values.

In practice, the diaphragm edges 8 often do not exactly form a rectangle, but do so only approximately. The angle specification (0° or 90°) therefore ensues in practice only in the framework of a small uncertainty that is generally mostly in the range of a few degrees, for example +/−3° or +/−5°. This angle uncertainty is true both for the parallelism of the diaphragm edges 8 and for the orthogonality of the diaphragm edges 8.

Naturally, the inventive detection method is also not limited to rectangular diaphragm structures. The diaphragm structures can be of other types. For example, without anything further a search for a regular hexagon or for a triangle is possible. Given specification of a square or another even-numbered regular polygon (for example hexagon, octagon, . . . ), it can furthermore be considered that the distance of the diaphragm edges 8 parallel to one another must be constant for all such pairs.

By the inventive detection method, weakly contrasting diaphragm edges 8 can also be automatically detected with a computer with a probability limited in terms of reliability. The consideration of the known diaphragm structure enables the largely predominant part of the possible error recognition to be excluded based on plausibility tests.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computer-assisted method for detecting edges of a mechanical diaphragm in an image of a subject, caused by gating radiation for producing the image with the mechanical diaphragm before said radiation penetrates the subject, said image containing a closed polygon formed by said edges of said mechanical diaphragm and also containing anatomical image edges representing anatomy of the subject, comprising the steps of:

supplying image data representing said image to a computer together with information, separate from said image data, describing a relationship of multiple sides of said closed polygon to each other; and in the computer, automatically analyzing said image data to detect all image edges in the image, and automatically distinguishing said edges of said mechanical diaphragm in said image data from said anatomical image edges using said information describing said closed polygon.

2. A method as claimed in claim 1 wherein said image comprises a plurality of two-dimensionally arranged pixels, each having a grey scale value between a minimum value and a maximum value, and wherein said image data represent the respective grey scale values of the pixels, and wherein the step of detecting said image edges in said image comprises determining for each pixel, a derivative value from the grey scale value for that pixel and a grey scale of at least one other pixel and determining said image edges using said derivative values.

3. A method as claimed in claim 2 comprising determining said derivative values as a sum of at least four summands, and forming each summand as a product of said derivative in a derivative direction and a weighting factor, and comprising determining said weighting factor in said computer specific to the derivative.

4. A method as claimed in claim 3 comprising employing pairs of directions as said derivative directions, the directions in each pair being oppositely directed.

5. A method as claimed in claim 4 comprising employing pairs of derivative directions disposed at an angle that is different from 0° and 180°.

6. A method as claimed in claim 5 comprising employing pairs of derivative directions disposed at an angle of approximately 90°.

7. A method as claimed in claim 5 wherein said image comprises main axes orthogonal to each other and comprising employing derivative directions proceeding parallel to said main axes.

8. A method as claimed in claim 3 comprising, in said computer, reducing the weighting factor that is specific to the derivative for a pixel under consideration when said computer determines a non-zero derivative for an intermediate pixel disposed between the pixel under consideration and an initial pixel, said initial pixel being disposed at an edge of said image and a vector from said initial pixel to the pixel under consideration corresponding to the respective derivative direction.

9. A method as claimed in claim 8 wherein, if a magnitude of the derivative for the intermediate pixel is equal to the magnitude of the derivative for the pixel under consideration, in said computer reducing the weighting factor specific to the derivative of the intermediate pixel more, if said derivative of the intermediate pixel is negative, than if said derivative for said intermediate pixel is positive.

10. A method as claimed in claim 1 comprising employing, as said information describing said polygon, a designation of a known angle formed between two of said diaphragm edges and comprising, in said computer, detecting said diaphragm edges by detecting groups of image edges which, with one another, form said known angle.

11. A method as claimed in claim 10 comprising additionally employing, in said information describing said polygon, a designation that two of said diaphragm edges are parallel to each other and, in said computer, determining image edges as being diaphragm edges only if said images are parallel to each other and exhibit a minimum spacing from each other.

12. A method as claimed in claim 1 wherein said image comprises a plurality of two-dimensionally arranged pixels, each having a grey scale value between a minimum value and a maximum value, and wherein said image date represent the respective grey scale values of the pixels, and wherein the step of detecting said image edges in said image comprises determining for each pixel, a derivative value from the grey scale value for that pixel and a grey scale of at least one other pixel and determining said image edges using said derivative values, and employing, as said information describing said polygon, a designation of a known angle formed between two of said diaphragm edges and comprising, in said computer, detecting said diaphragm edges by detecting groups of image edges which, with one another, form said known angle, and, for said groups of image edges forming with one another said known angle, forming a sum value in the computer of the derivative values and testing said groups of image edges with larger sum values before groups of image edges with lower sum values.

13. A computer-readable medium encoded with programming instruction, said medium being loadable into a computer supplied with image data of a subject, said image data being produced by irradiating the subject with radiation gated by edges of a mechanical diaphragm before the radiation penetrates the subject, and said image containing a closed polygon formed by the edges of the mechanical diaphragm, and also containing anatomical image edges representing anatomy of the subject, said programming instructions causing the computer to:
  receive said image data together with information, separate from said image data, describing a relationship of multiple sides of said closed polygon;
  analyze said image data to detect all image edges in the image;
  distinguish the edges of said mechanical diaphragm in said image data from the anatomical image edges using said information describing said closed polygon; and
  include an accurate representation of the edges of said mechanical diaphragm in said image data.

14. A computer comprising a memory containing image data representing an image of a subject produced by irradiating the subject with radiation gated by edges of a mechanical diaphragm before the radiation penetrates the subject, said image containing a closed polygon formed by the edges of said mechanical diaphragm, and also containing anatomical image edges representing anatomy of the subject, and a processor programmed to receive said image data together with information, separate from said image data, describing a relationship of multiple sides of said closed polygon to each other, and to automatically analyze said image data to detect all image edges in the image, and to distinguish the edges of said mechanical diaphragm in said image data from the anatomical image edges using said information describing said closed polygon.

* * * * *